US012597638B2

(12) United States Patent
Kang et al.

(10) Patent No.: US 12,597,638 B2
(45) Date of Patent: Apr. 7, 2026

(54) SOLID ELECTROLYTE MEMBRANE, ALL-SOLID-STATE BATTERY USING THE SAME AND METHODS OF MANUFACTURING THEREOF

(71) Applicant: ELECTRONICS AND TELECOMMUNICATIONS RESEARCH INSTITUTE, Daejeon (KR)

(72) Inventors: Seok Hun Kang, Daejeon (KR); Young-Gi Lee, Daejeon (KR); Young Sam Park, Daejeon (KR); Dong Ok Shin, Daejeon (KR); Jaecheol Choi, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 699 days.

(21) Appl. No.: 18/048,684

(22) Filed: Oct. 21, 2022

(65) Prior Publication Data

US 2023/0411678 A1 Dec. 21, 2023

(30) Foreign Application Priority Data

Jun. 21, 2022 (KR) ........................ 10-2022-0075785

(51) Int. Cl.
*H01M 10/0562* (2010.01)
*H01M 10/0525* (2010.01)

(52) U.S. Cl.
CPC ... *H01M 10/0562* (2013.01); *H01M 10/0525* (2013.01)

(58) Field of Classification Search
CPC ...................... H01M 10/0562; H01M 10/0525
See application file for complete search history.

(56) References Cited

U.S. PATENT DOCUMENTS

| | | |
|---|---|---|
| 2015/0221981 A1 | 8/2015 | Lee |
| 2016/0028049 A1 | 1/2016 | Lee |
| 2016/0211498 A1* | 7/2016 | Kim .................... H01M 50/489 |

(Continued)

FOREIGN PATENT DOCUMENTS

| | | | | |
|---|---|---|---|---|
| CN | 111916629 A | * | 11/2020 | ........ H01M 10/0562 |
| JP | 2020136187 A | * | 8/2020 | ........ H01M 10/0525 |

(Continued)

OTHER PUBLICATIONS

Machine Translation of KR-20220033460-A (Aug. 26, 2025) (Year: 2025).*

(Continued)

*Primary Examiner* — Matthew J Merkling

(57) ABSTRACT

Provided are a solid electrolyte membrane, an all-solid-state battery including the same and methods of manufacturing thereof. The solid electrolyte membrane includes a texture-type support having oppositely disposed first side and second side, and having multiple pores inside thereof, and a solid electrolyte filling up the pores and covering at least one side of the support, wherein the support may include a lithium salt, a polymer material or a first solid electrolyte material, or combinations thereof, and show ion conductivity. The solid electrolyte may include a second solid electrolyte material.

19 Claims, 5 Drawing Sheets

10

(56) References Cited

U.S. PATENT DOCUMENTS

| | | | |
|---|---|---|---|
| 2018/0166741 A1* | 6/2018 | Xu | H01M 10/052 |
| 2020/0395631 A1 | 12/2020 | Kim et al. | |
| 2021/0175539 A1* | 6/2021 | Lee | H01M 4/667 |
| 2021/0328260 A1 | 10/2021 | Lee | |
| 2021/0336294 A1* | 10/2021 | Kim | B32B 27/12 |

FOREIGN PATENT DOCUMENTS

| | | | | |
|---|---|---|---|---|
| KR | 10-2020-0050817 A | 5/2020 | | |
| KR | 10-2020-0078181 A | 7/2020 | | |
| KR | 10-2020-0085210 A | 7/2020 | | |
| KR | 10-2020-0127894 A | 11/2020 | | |
| KR | 10-2020-0141865 A | 12/2020 | | |
| KR | 10-2022-0033460 A | 3/2022 | | |
| KR | 20220033460 A * | 3/2022 | | H01M 10/0562 |
| WO | WO-2020036252 A1 * | 2/2020 | | H01M 50/403 |

OTHER PUBLICATIONS

Machine Translation of CN-111916629-A (Aug. 26, 2025) (Year: 2025).*

Machine Translation of JP-2020136187-A (Aug. 26, 2025) (Year: 2025).*

Machine Translation of WO-2020036252-A1 (Aug. 26, 2025) (Year: 2025).*

Ruochen Xu et al., "Cathode-Supported All-Solid-State Lithium-Sulfur Batteries with High Cell-Level Energy Density," ACS Energy Letters, 2019.

Young Jin Nam et al., "Bendable and Thin Sulfide Solid Electrolyte Film: A New Electrolyte Opportunity for Free-Standing and Stackable High-Energy All-Solid-State Lithium-Ion Batteries," Nano Letters, 2015.

Xuning Feng et al., "Thermal runaway mechanism of lithium ion battery for electric vehicles: A review," Energy Storage Materials 10, 2018.

* cited by examiner

10

100         200         300

201

FIB

202

FIB

202

SOLID ELECTROLYTE MEMBRANE, ALL-SOLID-STATE BATTERY USING THE SAME AND METHODS OF MANUFACTURING THEREOF

CROSS-REFERENCE TO RELATED APPLICATIONS

This U.S. non-provisional patent application claims priority under 35 U.S.C. § 119 of Korean Patent Application No. 10-2022-0075785, filed on Jun. 21, 2022, the entire contents of which are hereby incorporated by reference.

BACKGROUND

The present disclosure herein relates to a solid electrolyte membrane, and more particularly, to an ion conductive solid electrolyte membrane and an all-solid-state battery including the same.

As lithium secondary batteries are utilized in electric vehicles and energy storage systems in medium and large field beyond the field of small electronic devices, the need on the lithium secondary batteries having high energy density is growing to extend usage time and mileage.

Lithium secondary batteries may be composed of an anode, a cathode, a separator and an electrolyte. As the electrolyte used in the lithium secondary battery, a liquid electrolyte is mostly used, and a carbonate-based solvent in which a lithium salt ($LiPF_6$) is dissolved, is used. The liquid electrolyte may have high lithium ion mobility and show excellent electrochemical properties, but there are big safety issues of ignition and explosion due to the growth of lithium dendrite and external impact.

Accordingly, studies on an all-solid-state battery using a solid electrolyte which may replace the liquid electrolyte, are being conducted. The all-solid-state battery using a solid electrolyte may suppress the growth of lithium dendrite and is effective for preventing fire and explosion issues. Accordingly, the all-solid-state battery may secure stability and mechanical strength, and receives attention in various application systems requiring high stability, such as electrical vehicles, energy storage systems and wearable devices.

However, the solid electrolyte has difficulty in commercialization, because of lower ion conductivity than the liquid electrolyte and due to a manufacturing method of an all-solid-state battery, which is not applicable to the conventional manufacturing method of a lithium secondary battery. Accordingly, studies on a solid electrolyte and a solid electrolyte membrane applying thereof for the commercialization of the all-solid-state battery, are continued.

SUMMARY

The task for solving of the present disclosure is to provide a solid electrolyte membrane having improved ion conductivity, and an all-solid-state battery including the same.

Another task for solving of the present disclosure is to provide methods of manufacturing a solid electrolyte membrane having improved ion conductivity and an all-solid-state battery including the same.

The task for solving of the present disclosure is not limited to the aforementioned tasks, and unreferred other tasks may be clearly understood by a person skilled in the art from the description below.

According to embodiments of the inventive concept for solving the above-described tasks, there is provided a solid electrolyte membrane and an all-solid-state battery including the same, include a texture-type support comprising oppositely disposed first side and second side, and multiple pores inside thereof, and a solid electrolyte filling up the pores and covering at least one side of the support. The support includes at least one of a lithium salt, a polymer material, or a first solid electrolyte material or combinations thereof, and may show ion conductivity. The solid electrolyte may include a second solid electrolyte material. 50 μm.

In an embodiment, a diameter of the pore may be about 1 μm to about 50 μm.

In an embodiment, the first solid electrolyte material may include at least one of (Li, La)$TiO_3$ (LLTO), $Li_{1+x}Ti_{2-x}M_x$ $(PO_4)_3$ (M=Al, Ga, In, Sc), $Li_7La_3Zr_2O_{12}$ (LLZO), or one of precursor materials thereof or combinations thereof.

In an embodiment, the lithium salt may include at least one of $LiPF_6$, $LiBF_4$, $LiSbF_6$, $LiAsF_6$, $LiClO_4$, LiN $(C_2F_5SO_2)_2$, $LiN(CF_3SO_2)_2$, $CF_3SO_3Li$, $LiC(CF_3SO_2)_3$, or $LiC_4BO_8$ or combinations thereof.

In an embodiment, the polymer material may include at least one of polytetrafluoroethylene, (PTFE), polyvinylidene fluoride (PVdF), poly(ethylene oxide), polyacrylonitrile, hydroxypropyl cellulose, carboxymethyl cellulose, styrene-butadiene rubber, nitrile-butadiene rubber, polyacrylate, or polyacrylic acid or combinations thereof.

In an embodiment, the second solid electrolyte material may include at least one of (Li, La)$TiO_3$ (LLTO), $Li_{1+x}Ti_{2-x}M_x(PO_4)_3$ (M=Al, Ga, In, Sc), $Li_7La_3Zr_2O_{12}$ (LLZO)), $Li_3PS_4$ (LPS), or LPSCl or combinations thereof.

In an embodiment, the solid electrolyte membrane may be disposed between an anode and a cathode of an all-solid-state battery.

According to embodiments of the inventive concept, there is provided methods of manufacturing a solid electrolyte membrane and an all-solid-state battery including the same, including preparing a first precursor solution including at least one of a lithium salt, a polymer material, or a first solid electrolyte material or combinations thereof, spinning the first precursor solution into a fiber-type by an electrospinning into a texture-type support, heating the support, and applying a second precursor solution on at least one side of the support and pressurizing to fill up pores of the support, wherein the support may show ion conductivity.

In an embodiment, the first solid electrolyte material may include at least one of (Li, La)$TiO_3$ (LLTO), $Li_{1+x}Ti_{2-x}M_x$ $(PO_4)_3$ (M=Al, Ga, In, Sc), $Li_7La_3Zr_2O_{12}$ (LLZO), or one of precursor materials thereof or combinations thereof.

In an embodiment, the second precursor solution may be obtained by dispersing a second solid electrolyte material and a polymer binder in a nonpolar solvent.

In an embodiment, the second solid electrolyte material may include at least one of any one among (Li, La)$TiO_3$ (LLTO), $Li_{1+x}Ti_{2-x}M_x(PO_4)_3$ (M=Al, Ga, In, Sc), $Li_7La_3Zr_2O_{12}$ (LLZO)), $Li_3PS_4$ (LPS), or LPSCl or combinations thereof.

In an embodiment, the lithium salt may include at least one of $LiPF_6$, $LiBF_4$, $LiSbF_6$, $LiAsF_6$, $LiClO_4$, LiN $(C_2F_5SO_2)_2$, $LiN(CF_3SO_2)_2$, $CF_3SO_3Li$, $LiC(CF_3SO_2)_3$, or $LiC_4BO_8$ or combinations thereof.

In an embodiment, the polymer material may include at least one of polytetrafluoroethylene, (PTFE), polyvinylidene fluoride (PVdF), poly(ethylene oxide), polyacrylonitrile, hydroxypropyl cellulose, carboxymethyl cellulose, styrene-butadiene rubber, nitrile-butadiene rubber, polyacrylate, or polyacrylic acid or combinations thereof.

In an embodiment, a diameter of the pore may be about 1 μm to about 50 μm.

BRIEF DESCRIPTION OF THE FIGURES

The accompanying drawings are included to provide a further understanding of the inventive concept, and are incorporated in and constitute a part of this specification. The drawings illustrate example embodiments of the inventive concept and, together with the description, serve to explain principles of the inventive concept. In the drawings.

DETAILED DESCRIPTION

Figure 1:
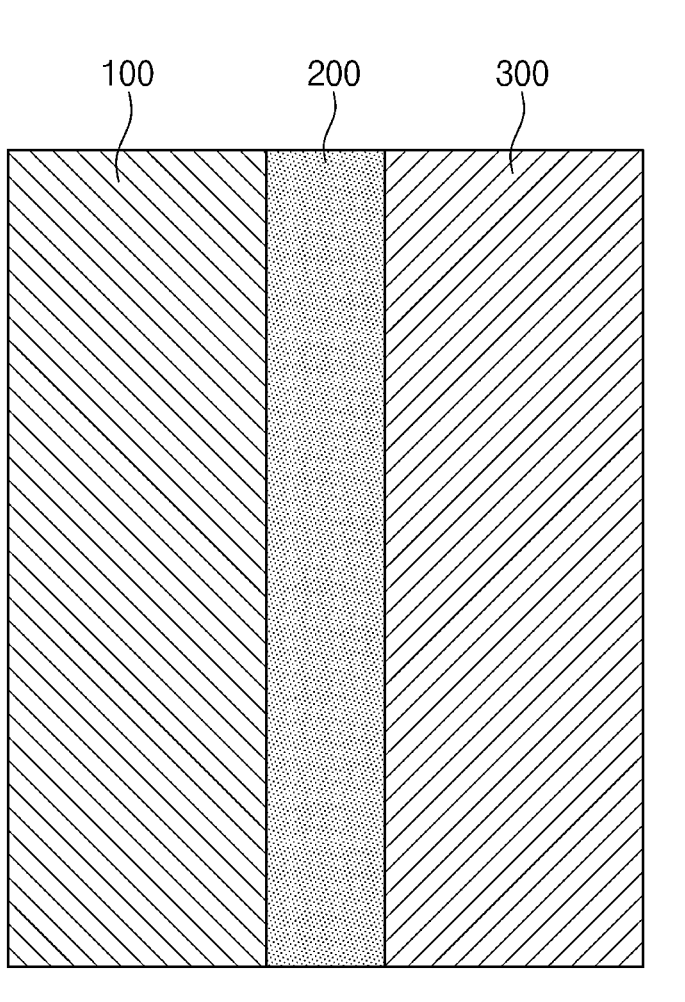
FIG. 1 is a cross-sectional view of a solid electrolyte membrane and an all-solid-state battery including the same according to embodiments of the inventive concept.

Preferred embodiments of the inventive concept will be explained with reference to the accompany drawings for sufficient understanding of the configurations and effects of the inventive concept. The inventive concept may, however, be embodied in various forms, have various modifications and should not be construed as limited to the embodiments set forth herein. The embodiments are provided to complete the disclosure of the inventive concept through the explanation of the embodiments and to completely inform a person having ordinary knowledge in this technical field to which the inventive concept belongs of the scope of the inventive concept. A person having ordinary knowledge in this technical field might understand suitable environments in which the inventive concept may be performed.

In the disclosure, the terms used herein are to explain embodiments but are not to limit the inventive concept. In the disclosure, the singular forms are intended to include the plural forms as well, unless the context clearly indicates otherwise. The terms "comprises" and/or "comprising," used in the disclosure, specify the presence of stated materials, elements, steps and/or devices, but do not preclude the presence or addition of one or more other materials, elements, steps and/or devices.

In the disclosure, it will be understood that when a film (or layer) is referred to as being on another film (or layer), it can be directly formed on the other film (or layer) or a substrate, or a third intervening film (or layer) may be present.

In various example embodiments in the disclosure, although the terms first, second, third, etc. may be used herein to describe various regions, films (or layers), etc., these regions and films should not be limited by these terms. These terms are only used to distinguish one region or film (or layer) from another region or film (or layer). Thus, a first layer material referred to in an embodiment could be termed a second layer material in another embodiment. Embodiments explained and illustrated herein may include their complementary embodiments. In the description, parts designated by the same reference numerals refer to the same configuration elements throughout.

In various embodiments in the disclosure, each of the phrases "A or B", "at least one among A and B", "at least one of A or B", "A, B or C", "at least one among A, B and C", and "at least one of A, B or C" may include any one among the items illustrated together in the phrase, or possible combinations thereof.

The terms used in the embodiments of the inventive concept may be interpreted as commonly known meanings to a person having common knowledge in this technical field, unless otherwise defined.

Hereinafter, a solid electrolyte membrane and an all-solid-state battery including the same according to the inventive concept will be explained referring to attached drawings.

FIG. 1 is a cross-sectional view for explaining an all-solid-state battery according to embodiments of the inventive concept.

Referring to FIG. 1, an all-solid-state battery 10 may include an anode 100, a cathode 300 and a solid electrolyte membrane 200. The anode 100 and the cathode 300 may be oppositely disposed to each other with the solid electrolyte membrane 200 therebetween. That is, the anode 100 and the cathode 300 may be separated from each other with the solid electrolyte membrane 200 therebetween. The anode 100 may be any one among a carbonaceous material, a silicon-containing material and a lithium-containing material, or mixtures thereof. The cathode 300 may be a lithium metal oxide containing lithium and a transition metal. For example, lithium cobalt oxide ($LiCoO_2$), lithium nickel oxide ($LiNiO_2$), lithium nickel manganese cobalt oxide ($LiNi_xMn_yCo_{1-x-y}O_2$), lithium iron phosphate ($LiFePO_4$) or lithium manganese oxide ($LiMnO_4$) may be used, but an embodiment of the inventive concept is not limited thereto.

The solid electrolyte membrane 200 may be disposed between the anode 100 and the cathode 300. The solid electrolyte membrane 200 may be provided in a thin-film type. The solid electrolyte membrane 200 may contact with one side of the anode 100 and one side of the cathode 300. The thickness of the solid electrolyte membrane 200 may be about 10 μm to about 50 μm. The solid electrolyte membrane 200 may include a support and a solid electrolyte, which will be explained later referring to FIG. 2 to FIG. 5. This will be explained later in more detail referring to FIG. 2 to FIG. 5. The solid electrolyte membrane 200 may play the role of transferring ions between the anode 100 and the cathode 300. For example, the solid electrolyte membrane 200 may transfer lithium (Li) ions between the anode 100 and the cathode 300.

Figure 2:
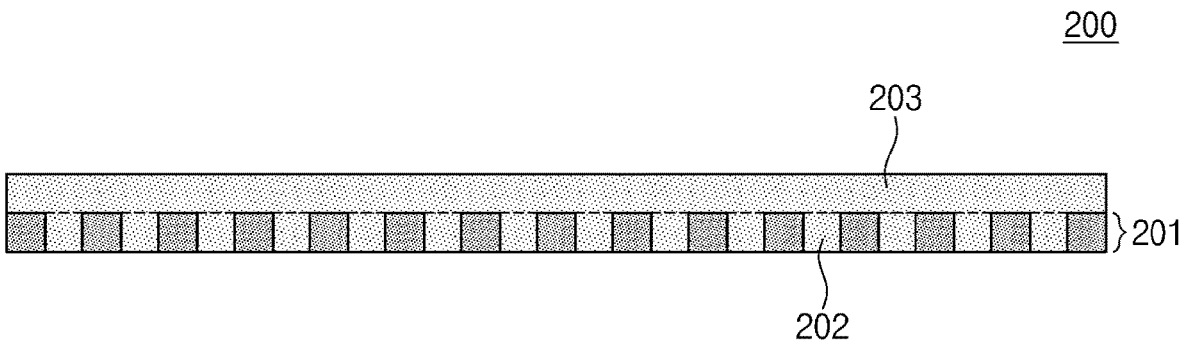
FIG. 2 is a cross-sectional view of a solid electrolyte membrane according to embodiments of the inventive concept.

FIG. 2 is a cross-sectional view of a solid electrolyte membrane according to embodiments of the inventive concept.

Referring to FIG. 2, a solid electrolyte membrane 200 may include a support 201 and a solid electrolyte 203. The support 201 may play the role of defining the whole shape of the solid electrolyte membrane 200, and the solid electrolyte 203 may play the role of increasing the ion conductivity of the solid electrolyte membrane 200. Hereinafter, the configuration of the support 201 will be explained in more detail referring to FIG. 3 to FIG. 5.

Figure 3:
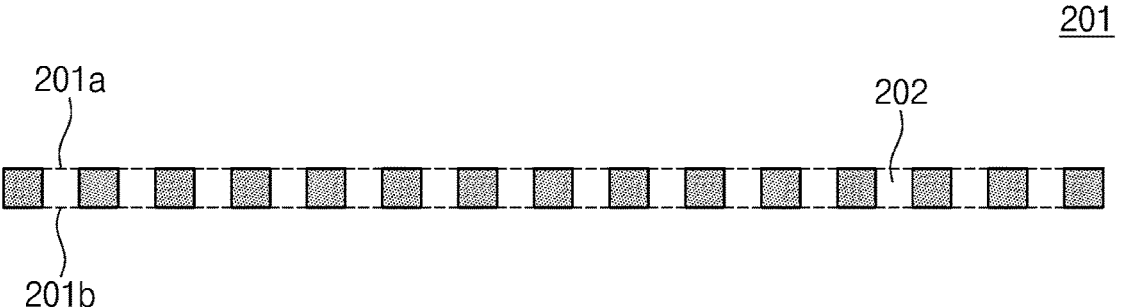
FIG. 3 is a cross-sectional view of a support according to embodiments of the inventive concept.
Figure 4:
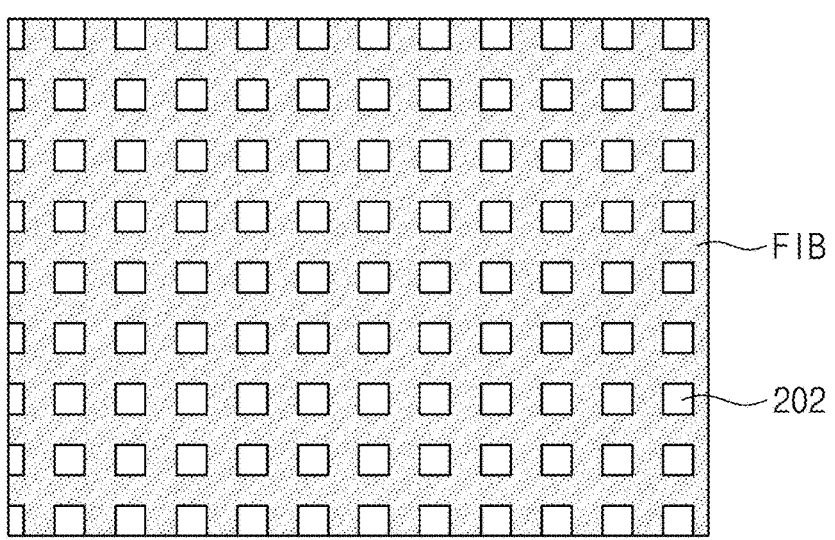
FIG. 4 is a plan view of a support according to embodiments of the inventive concept.

FIG. 3 is a cross-sectional view of a support according to embodiments of the inventive concept. FIG. 4 is a plan view of a support according to embodiments of the inventive concept.

Referring to FIG. 3 and FIG. 4 together, the whole shape of the support 201 may be a planar shape. The support 201 may include a first side 201*a* and a second side 201*b*, which are oppositely disposed to each other. The support 201 may be a texture-type support. For example, the support 201 may be an aggregate of intersecting fibers FIB. In more detail, the support 201 may have multiple fibers FIB. The fibers FIB may be extended in parallel to the first side 201*a* or the second side 201*b* of the support 201, and the fibers FIB may be disposed to cross each other. In this case, the arrangement of the fibers FIB may be regular. The fibers FIB may have a first arrangement that is parallel to the anode 100 and the cathode 300 (see FIG. 1). The fibers FIB may have a second arrangement that is parallel to the anode 100 (see FIG. 1) and the cathode 300 (see FIG. 3) and vertical to the first arrangement. Accordingly, the fibers FIB may cross vertically. The diameters of the fibers FIB may be the same. However, an embodiment of the inventive concept is not limited thereto, and the extended direction, arrangement and length of the fibers FIB may be irregular. For example, the support 201 may be a non-woven fabric-type support.

Hereinafter, the explanation will be continued based on the embodiments of FIG. 3 and FIG. 4. The fibers FIB of the support 201 may include a lithium salt, a polymer material, or a first solid electrolyte material or combinations thereof. The first solid electrolyte material may include an oxide-based solid electrolyte. The first solid electrolyte material may include at least one of (Li, La)TiO$_3$ (LLTO), Li$_{1+x}$Ti$_{2-x}$M$_x$(PO$_4$)$_3$ (M=Al, Ga, In, Sc), Li$_7$La$_3$Zr$_2$O$_{12}$ (LLZO), and precursor materials thereof or combinations thereof. The first solid electrolyte material may include the same material as a second electrolyte material which will be explained later, but an embodiment of the inventive concept is not limited thereto. The first solid electrolyte material may have ion conductivity, and accordingly, the support 201 may have ion conductivity. The lithium salt may include at least one of LiPF$_6$, LiBF$_4$, LiSbF$_6$, LiAsF$_6$, LiClO$_4$, LiN(C$_2$F$_5$SO$_2$)$_2$, LiN(CF$_3$SO$_2$)$_2$, CF$_3$SO$_3$Li, LiC(CF$_3$SO$_2$)$_3$, or LiC$_4$BO$_8$ or combinations thereof. The lithium salt may have ion conductivity, and accordingly, the support 201 may have ion conductivity. The polymer material may include at least one of polytetrafluoroethylene (PTFE), polyvinylidene fluoride (PVdF), poly(ethylene oxide), polyacrylonitrile, hydroxy-propyl cellulose, carboxymethyl cellulose, styrene-butadiene rubber, nitrile-butadiene rubber, polyacrylate or polyacrylic acid or compounds thereof. However, an embodiment of the inventive concept is not limited thereto, and the support 201 may include polymer materials that could be made into fibers.

The support 201 may include multiple pores 202. The pores 202 may be vacant spaces (for example, cavities, holes) in which the fibers FIB are not provided in the support 201. The pores 202 may have the same size. As shown in FIG. 3 and FIG. 4, the pores 202 may be arranged regularly in the support 201. However, an embodiment of the inventive concept is not limited thereto, and the pores 202 may have irregular types of size and arrangement. The support 201 may have pores 202 penetrating the support 201. The space on the first side 201*a* of the support 201 and the space on the second side 201*b* of the support 201 may be connected through the holes 202 in the support 201. Accordingly, a flowable material may pass from the first side 201*a* to the second side 201*b* of the support 201 through the pores

202 in the support 201. The diameter of each of the pores 202 may be from about 1 μm to about 50 μm.

Figure 5:
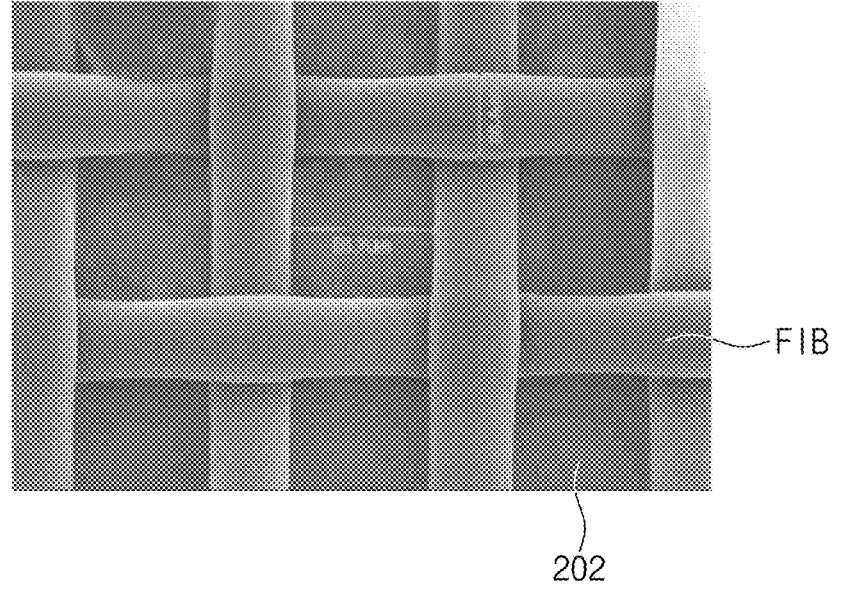
FIG. 5 is a scanning electron microscope (SEM) image of a support according to embodiments of the inventive concept.

FIG. 5 is a scanning electron microscope (SEM) image of a support according to embodiments of the inventive concept. After manufacturing a support 201 of a solid electrolyte membrane 200 according to embodiments of the inventive concept, SEM imaging was conducted. As shown in FIG. 5, it could be confirmed that the support includes multiple fibers FIB, and pores 202 are positioned among the fibers FIB. The image of FIG. 5 corresponds to one among the embodiments of the inventive concept, and an embodiment of the inventive concept is not limited thereto.

Referring to FIG. 2 again, the solid electrolyte membrane 200 may include a solid electrolyte 203. The support 201 may be impregnated with the solid electrolyte 203. For example, the solid electrolyte 203 may fill up the pores 202 of the support 201. Since the support 201 has the pores 202 penetrating the support 201, the solid electrolyte 203 filling up the pores 202 may be extended from one side to the other side of the support 201. The solid electrolyte 203 may be exposed to the first side 201*a* (see FIG. 3) and the second side 201*b* (see FIG. 3) of the support 201. Accordingly, a passage for transferring ions through the solid electrolyte 203 between the first side 201*a* and the second side 201*b* of the support 201 may be provided. The solid electrolyte 203 may be extended on the one side of the support 201 (any one among the first side 201*a* (see FIG. 3) and the second side 201*b* (see FIG. 3)). The solid electrolyte 203 may cover the one side of the support 201. Accordingly, the one side of the solid electrolyte membrane 200 may expose the solid electrolyte 203, and the other side of the solid electrolyte membrane 200 may expose the support 201.

The solid electrolyte 203 may include a second solid electrolyte material. The second solid electrolyte material may be an oxide-based lithium ion solid electrolyte. The second solid electrolyte material may be a sulfide-based lithium ion solid electrolyte. For example, the second solid electrolyte material may include at least one of (Li, La)TiO$_3$ (LLTO), Li$_{1+x}$Ti$_{2-x}$M$_x$(PO$_4$)$_3$ (M=Al, Ga, In, Sc), Li$_7$La$_3$Zr$_2$O$_{12}$ (LLZO), Li$_3$PS$_4$ (LPS), LPSCl, or materials including the precursors thereof or combinations thereof. However, an embodiment of the inventive concept is not limited thereto, and may include other materials having lithium ion conductivity.

The solid electrolyte membrane 200 according to embodiments of the inventive concept is provided with a support 201 which may support the solid electrolyte 203, in addition to the solid electrolyte 203, and the mechanical strength and structural stability of the solid electrolyte membrane 200 may be improved. By including the first solid electrolyte material in the support 201, the support 201 itself may play the role of the solid electrolyte. In addition, by providing the support 201 having ion conductivity, both the solid electrolyte 203 and the support 201 may have ion conductivity, and a solid electrolyte membrane 200 having improved ion conductivity may be provided. The support 201 may be flexible. Accordingly, the solid electrolyte membrane 200 including the support 201 may also be flexible.

In FIG. 2, the solid electrolyte 203 covers any one among both sides of the support 201, but an embodiment of the inventive concept is not limited thereto.

Figure 6:
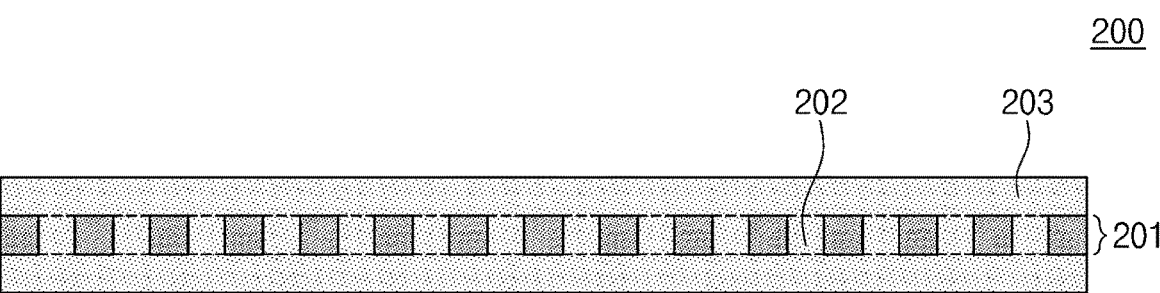
FIG. 6 is a cross-sectional view of a solid electrolyte membrane according to embodiments of the inventive concept.

FIG. 6 is a cross-sectional view of a solid electrolyte membrane according to embodiments of the inventive concept.

As shown in FIG. 6, a solid electrolyte 203 may be extended to both sides of the support 201 (for example, a first side 201*a* (see FIG. 3) and a second side (see FIG. 3)).

The solid electrolyte 203 may cover both sides of the support 201. Accordingly, both sides of the solid electrolyte membrane 200 may expose the solid electrolyte 203.

According to embodiments of the inventive concept, since both sides of the solid electrolyte membrane 200, which are contacted with external electrodes (for example, the anode 100 and the cathode 300, explained referring to FIG. 1), are covered with the solid electrolyte 203, the contact areas between the external electrodes and the solid electrolyte 203 may be large. That is, ion conductivity between both sides of the solid electrolyte membrane 200 may be improved.

Figure 7:
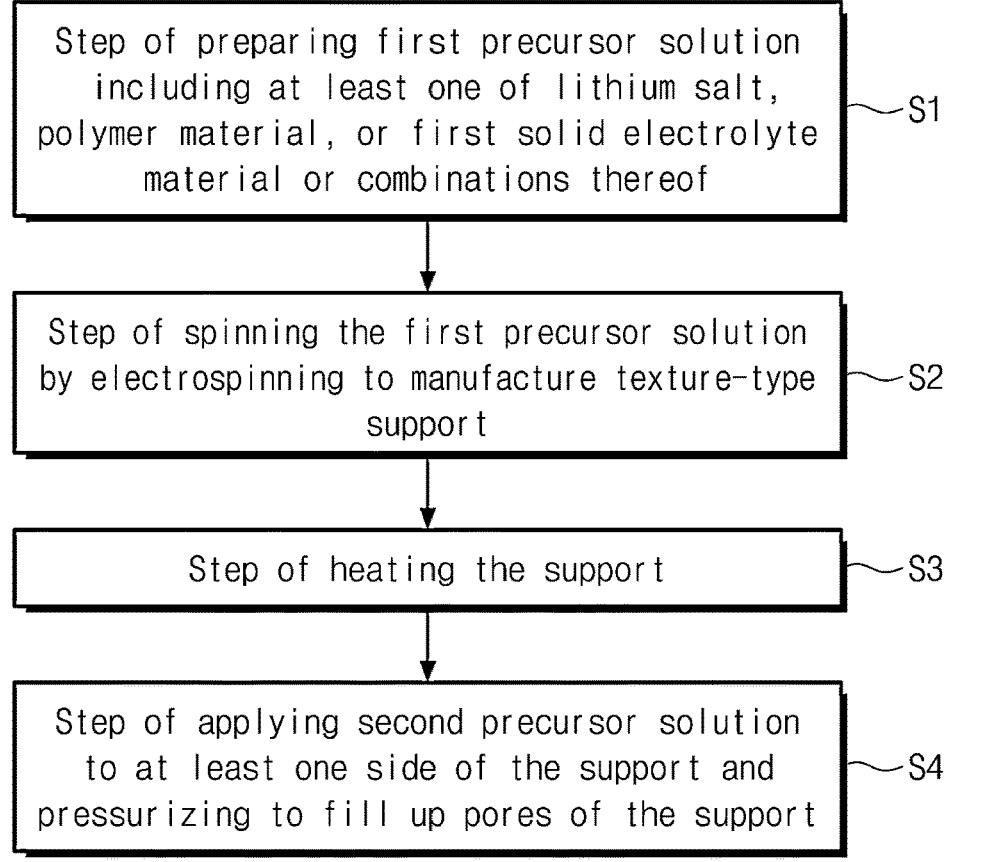
FIG. 7 is a flowchart for explaining methods of manufacturing a solid electrolyte membrane and an all-solid-state battery including the same according to embodiments of the inventive concept.
Figure 8:
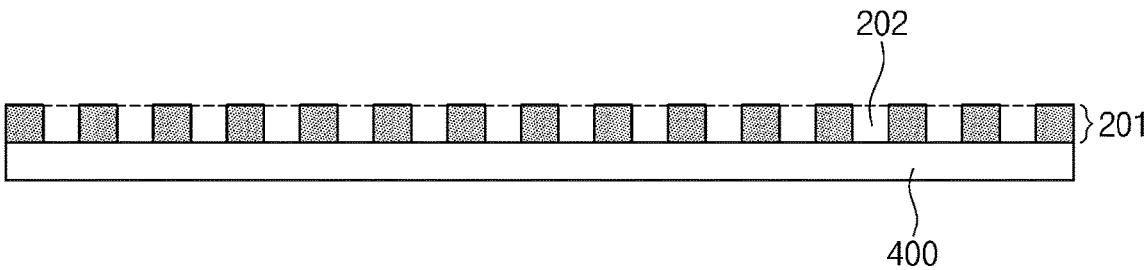
FIGS. 8, 9, and 10 are cross-sectional views for explaining a method of manufacturing a solid electrolyte membrane according to embodiments of the inventive concept.
Figure 9:
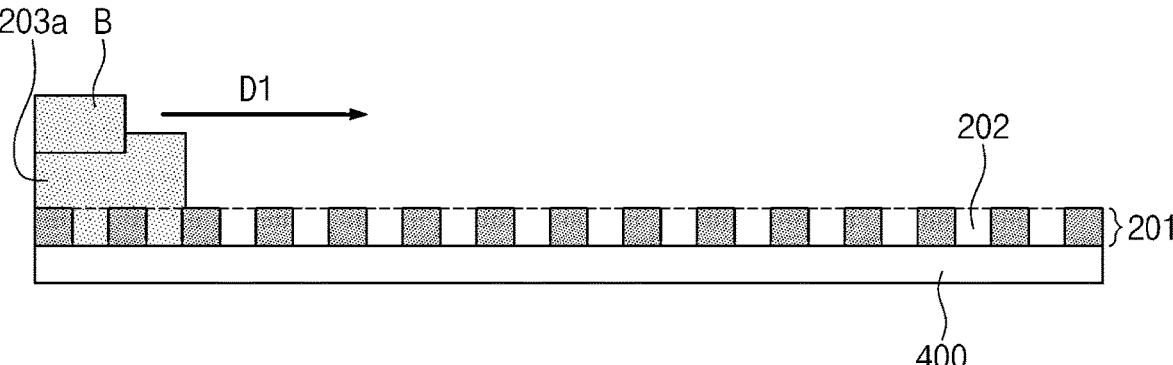
Figure 10:
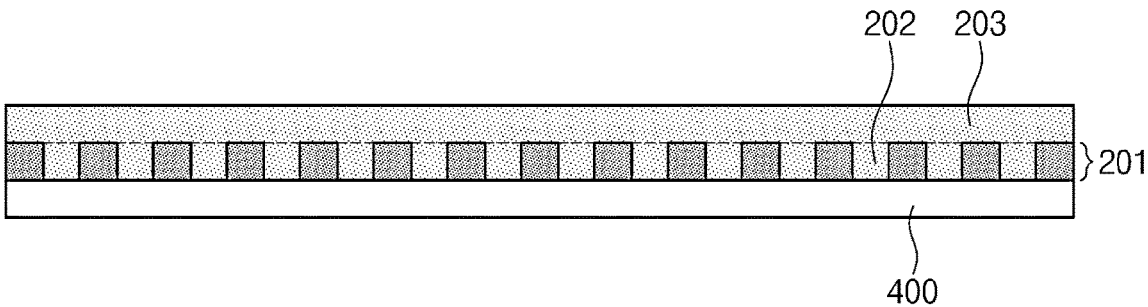

FIG. 7 is a flowchart for explaining a method of manufacturing a solid electrolyte membrane for an all-solid-state battery according to embodiments of the inventive concept. FIG. 8 to FIG. 10 are cross-sectional views for explaining a method of manufacturing a solid electrolyte membrane for an all-solid-state battery according to embodiments of the inventive concept.

Referring to FIG. 7 to FIG. 10, a solid electrolyte membrane for an all-solid-state battery according to an embodiment of the inventive concept may be manufactured through the steps below. The solid electrolyte membrane for an all-solid-state battery may be obtained through a step of preparing a first precursor solution including a lithium salt, a polymer material or a first solid electrolyte material, or combinations thereof (S1), a step of spinning the first precursor solution by an electrospinning into a fiber-type and manufacturing a texture-type support (S2), a step of heating the support (S3), and a step of applying a second precursor solution to at least one side of the support and pressurizing to fill up the pores of the support (S4).

Referring to FIG. 7, a step of preparing a first precursor solution including a lithium salt, a polymer material or a first solid electrolyte material, or combinations thereof (S1), may be performed. In order to prepare the first precursor solution, the same materials as the materials included in the lithium salt, the polymer material and the first solid electrolyte material, explained referring to FIG. 3 and FIG. 4, may be prepared. By dissolving the lithium salt, the polymer material and the first solid electrolyte material in a solvent, a first precursor solution may be prepared. In order to uniformly disperse the lithium salt, the polymer material and the first solid electrolyte material in the solvent, the step of preparing the first precursor solution (S1) may be accompanied with a stirring process. The first precursor solution may be a viscous solution.

Referring to FIG. 7 and FIG. 8, a step of spinning the first precursor solution into a fiber-type by an electrospinning and manufacturing a texture-type support (S2), may be performed. The electrospinning may include applying an electric field onto a substrate 400 on which a support 201 is to be formed, and spraying the first precursor solution so as to pass through the electric field. By performing the electrospinning, the first precursor solution may be spun into a texture-type. After spinning the first precursor solution into a texture-type by the electrospinning, a step of crossing the fibers vertically, may be performed. The fibers may form a support 201 with a vertically crossed-type. Accordingly, the support 201 may be formed in a texture-type. The support 201 may have pores 202 penetrating straight in the thickness direction of the support 201. However, an embodiment of the inventive concept is not limited thereto, and a support 201 with a crossed non-woven fabric-type of fibers may be formed. The support 201 having a non-woven fabric-type may have an open-cell structure. The support 201 may include crossed fibers and may be manufactured into a film-type including both sides oppositely disposed In the step of spinning the first precursor solution into a fiber-type by an electrospinning and manufacturing the texture-type support 201 (S2), multiple pores 202 may be formed in the support 201. In the step of manufacturing the support 201, pores 202 having low curvature may be formed. Here, the curvature is an index showing a practical distance in contrast to a straight distance. If a solid electrolyte fills up pores 202 with low curvature, ions may move smoothly. For example, the pores 202 formed during manufacturing the support 201 may be pores 202 penetrating the support 201 straight. Through the pores 202 penetrating straight between an anode and a cathode, the ions in the solid electrolyte membrane may move straight. As a result, the ion conductivity of the solid electrolyte membrane may be increased.

The step of heating the support 201 (S3), may be performed. The heating process may be a process for removing the solvent contained in the fibers of the support 201. In addition, the heating process may be a process for preparing the first solid electrolyte materials contained in the fibers into a solid electrolyte-type having high ion conductivity.

The step for applying the second precursor solution to at least one side of the support 201 and pressurizing to fill up the pores 202 of the support 201 (S4), may be performed. In detail, a step of preparing a second precursor solution 203a and a step of unifying the second precursor solution 203a and the support 201 may be included.

Referring to FIG. 7 to FIG. 10, a second precursor solution 203a may be prepared. The second precursor solution 203a may be prepared in a slurry-type. The process of preparing the second precursor solution 203a may include a step of pulverizing the second solid electrolyte and a step of dispersing the pulverized second solid electrolyte and a polymer binder in a solvent. The diameter of the pulverized second solid electrolyte may be about 0.1 μm to about 10 μm. In order to uniformly disperse the second solid electrolyte and the polymer binder in the solvent, a stirring process may be performed. To prepare the second solid electrolyte, the same materials as the materials included in the second solid electrolyte explained referring to FIG. 2, may be prepared. The solvent may be a nonpolar solvent. The solvent may be any one among hexane, heptane, nonane, decane, benzene, toluene, xylene, anisole, cyclohexanone, methyl ethyl ketone, tetrahydrofuran, N-methylpyrrolidone, hexamethylphosphoamide, dioxane, tetramethylurea, triethyl phosphate, trimethyl phosphate, dimethylformamide, dimethylsulfoxide and dimethylacetamide, or compounds thereof. The binder may be a binder that may be dissolved in the solvent. The binder may be any one among butadiene rubber, fluorine-based rubber, nitrile butadiene rubber, hydrogenated nitrile butadiene rubber, styrene butadiene rubber, styrene butadiene styrene, styrene ethylene butadiene styrene, acrylated styrene butadiene rubber, acrylonitrile butadiene styrene copolymer, polytetrafluoroethylene, polyvinylidene fluoride, a copolymer of vinylidene fluoride and hexafluoropropylene, polyvinyl chloride, polyacrylonitrile, polymethyl methacrylate, polyacrylate, polyethylene, polypropylene, polyethylene oxide, polyimide, polyethylene terephthalate, polybutylene terephthalate, polyphenylsulfide, polyether ether ketone, and tetrafluoroethylene, or compounds thereof.

Referring to FIG. 7, FIG. 9 and FIG. 10, the second precursor solution 203a and the support 201 may be unified. The application of the second precursor solution 203a may be application using a blade. For example, if a blade B moves in a parallel direction D1 to the support 201 on the support 201 on which the second precursor solution 203a is provided, the second precursor solution 203a may be applied on the support 201. The second precursor solution 203a applied on the support 201 may be pressed or absorbed in the support 201 through a pressurizing process. Through the pressurizing process, the pores 202 of the support 201 may be filled up. Through the pressurizing process, a solid electrolyte membrane with a thin-film type may be provided. The process for unifying the second precursor solution 203a and the support 201 may be accompanied with a drying process. The drying process may be a process of removing the solvent from the second precursor solution 203a. According to FIG. 8 to FIG. 10, a method of manufacturing a solid electrolyte membrane, including applying the second precursor solution 203a on one side of the support 201, is shown, but an embodiment of the inventive concept is not limited thereto. The second precursor solution 203a may be applied on both sides of the support 201.

The solid electrolyte membrane according to the inventive concept includes multiple pores in the support of the solid electrolyte membrane and imparts the support with ion conductivity, and may have high ion conductivity. In addition, by manufacturing a solid electrolyte membrane having unified support and solid electrolyte, a solid electrolyte membrane with a thin-film type, having excellent mechanical strength may be provided. Accordingly, an all-solid-state battery with high energy density may be provided.

Although the embodiments of the present invention have been described, it is understood that the present invention should not be limited to the embodiments, but various changes and modifications can be made by one ordinary skilled in the art within the spirit and scope of the present invention as hereinafter claimed.

What is claimed is:

1. A solid electrolyte membrane for an all-solid-state battery, the solid electrolyte membrane comprising:
   a texture-type support comprising oppositely disposed first side and second side, and multiple pores inside thereof; and
   a solid electrolyte filling up the pores and covering at least one side of the support,
   wherein the support includes a first solid electrolyte material, the support showing ion conductivity,
   wherein the first solid electrolyte material includes at least one of (Li, La)TiO$_3$ (LLTO), Li$_{1+x}$Ti$_{2-x}$M$_x$(PO$_4$)$_3$ (M=Al, Ga, In, Sc), Li$_7$La$_3$Zr$_2$O$_{12}$ (LLZO), or one of precursor materials thereof or combinations thereof, and
   the solid electrolyte includes a second solid electrolyte material.

2. The solid electrolyte membrane for an all-solid-state battery of claim 1, wherein a diameter of the pores is about 1 μm to about 50 μm.

3. The solid electrolyte membrane for an all-solid-state battery of claim 1, wherein the support further comprises a lithium salt, and wherein lithium salt includes at least one of LiPF$_6$, LiBF$_4$, LiSbF$_6$, LiAsF$_6$, LiClO$_4$, LiN(C$_2$F$_5$SO$_2$)$_2$, LiN(CF$_3$SO$_2$)$_2$, CF$_3$SO$_3$Li, LiC(CF$_3$SO$_2$)$_3$, or LiC$_4$BO$_8$ or combinations thereof.

4. The solid electrolyte membrane for an all-solid-state battery of claim 1, wherein support further comprises a polymer material, and wherein the polymer material includes at least one of polytetrafluoroethylene, (PTFE), polyvinylidene fluoride (PVdF), poly(ethylene oxide), polyacrylonitrile, hydroxypropyl cellulose, carboxymethyl cellulose, styrene-butadiene rubber, nitrile-butadiene rubber, polyacrylate, or polyacrylic acid or combinations thereof.

5. The solid electrolyte membrane for an all-solid-state battery of claim 1, wherein the second solid electrolyte material includes at least one of (Li, La)TiO$_3$ (LLTO), Li$_{1+x}$Ti$_{2-x}$M$_x$(PO$_4$)$_3$ (M=Al, Ga, In, Sc), Li$_7$La$_3$Zr$_2$O$_{12}$ (LLZO)), Li$_3$PS$_4$ (LPS), or LPSCl or combinations thereof.

6. The solid electrolyte membrane for an all-solid-state battery of claim 1, wherein the solid electrolyte membrane is disposed between an anode and a cathode of an all-solid-state battery.

7. A method of manufacturing a solid electrolyte membrane for an all-solid-state battery, the method comprising:
   preparing a first precursor solution including at least one of a lithium salt, a polymer material, or a first solid electrolyte material or combinations thereof;
   spinning the first precursor solution into a fiber-type by an electrospinning and weaving into a texture-type support;
   heating the support; and
   applying a second precursor solution on at least one side of the support and pressurizing to fill up pores of the support,
   wherein the support shows ion conductivity.

8. The method of manufacturing a solid electrolyte membrane for an all-solid-state battery of claim 7, wherein the first solid electrolyte material includes at least one of (Li, La)TiO$_3$ (LLTO), Li$_{1+x}$Ti$_{2-x}$M$_x$(PO$_4$)$_3$ (M=Al, Ga, In, Sc), Li$_7$La$_3$Zr$_2$O$_{12}$ (LLZO), or one of precursor materials thereof or combinations thereof.

9. The method of manufacturing a solid electrolyte membrane for an all-solid-state battery of claim 7, wherein the second precursor solution is obtained by dispersing a second solid electrolyte material and a polymer binder in a nonpolar solvent.

10. The method of manufacturing a solid electrolyte membrane for an all-solid-state battery of claim 9, wherein the second solid electrolyte material includes at least one of (Li, La)TiO$_3$ (LLTO), Li$_{1+x}$Ti$_{2-x}$M$_x$(PO$_4$)$_3$ (M=Al, Ga, In, Sc), Li$_7$La$_3$Zr$_2$O$_{12}$ (LLZO)), Li$_3$PS$_4$ (LPS), and LPSCl or combinations thereof.

11. The method of manufacturing a solid electrolyte membrane for an all-solid-state battery of claim 7, wherein the lithium salt includes at least one of LiPF$_6$, LiBF$_4$, LiSbF$_6$, LiAsF$_6$, LiClO$_4$, LiN(C$_2$F$_5$SO$_2$)$_2$, LiN(CF$_3$SO$_2$)$_2$, CF$_3$SO$_3$Li, LiC(CF$_3$SO$_2$)$_3$, or LiC$_4$BO$_8$ or combinations thereof.

12. The method of manufacturing a solid electrolyte membrane for an all-solid-state battery of claim 7, wherein the polymer material includes at least one of polytetrafluoroethylene, (PTFE), polyvinylidene fluoride (PVdF), poly(ethylene oxide), polyacrylonitrile, hydroxypropyl cellulose, carboxymethyl cellulose, styrene-butadiene rubber, nitrile-butadiene rubber, polyacrylate, or polyacrylic acid or combinations thereof.

13. The method of manufacturing a solid electrolyte membrane for an all-solid-state battery of claim 7, wherein a diameter of the pore is about 1 μm to about 50 μm.

14. A solid electrolyte membrane for an all-solid-state battery, the solid electrolyte membrane comprising:
   a texture-type support comprising oppositely disposed first side and second side, and multiple pores inside thereof; and
   a solid electrolyte filling up the pores and covering at least one side of the support,
   wherein the support includes a polymer material and a first solid electrolyte material, the support showing ion conductivity, and the solid electrolyte includes a second solid electrolyte material, wherein the first solid electrolyte material includes an oxide-based solid electrolyte, and wherein the second solid electrolyte material includes a sulfide based solid electrolyte.

15. The solid electrolyte membrane for an all-solid-state battery of claim 14, further comprising a lithium salt, wherein the lithium salt includes at least one of $LiPF_6$, $LiBF_4$, $LiSbF_6$, $LiAsF_6$, $LiClO_4$, $LiN(C_2F_5SO_2)_2$, $LiN(CF_3SO_2)_2$, $CF_3SO_3Li$, $LiC(CF_3SO_2)_3$, or $LiC_4BO_8$ or combinations thereof.

16. The solid electrolyte membrane for an all-solid-state battery of claim 14, wherein the first solid electrolyte material includes at least one of $(Li, La)TiO_3$ (LLTO), $Li_{1+x}Ti_{2-x}M_x(PO_4)_3$ (M=Al, Ga, In, Sc), $Li_7La_3Zr_2O_{12}$ (LLZO), or one of precursor materials thereof or combinations thereof.

17. The solid electrolyte membrane for an all-solid-state battery of claim 14, wherein the first solid electrolyte material includes at least one of $Li_3PS_4$ (LPS), LPSCl or combinations thereof.

18. The solid electrolyte membrane for an all-solid-state battery of claim 14, wherein the support comprises multiple fibers, and wherein the multiple fibers cross each other.

19. The solid electrolyte membrane for an all-solid-state battery of claim 18, wherein the support comprises a first side and a second side opposite to the first side, and wherein each of the multiple fibers extended in parallel to the first side or the second side of the support.

\* \* \* \* \*